United States Patent
Lemaire et al.

(10) Patent No.: US 6,645,272 B2
(45) Date of Patent: Nov. 11, 2003

(54) PROCESS FOR DEACIDIZING A GAS BY ABSORPTION IN A SOLVENT WITH TEMPERATURE CONTROL

(75) Inventors: Eric Lemaire, Lyons (FR); Jean-Charles Viltard, Vienne (FR)

(73) Assignee: Institute Francais du Petrole, Rueil-Malmaison cedex (FR)

( * ) Notice: Subject to any disclaimer, the term of this patent is extended or adjusted under 35 U.S.C. 154(b) by 116 days.

(21) Appl. No.: 09/960,290

(22) Filed: Sep. 24, 2001

(65) Prior Publication Data
US 2002/0059865 A1 May 23, 2002

(30) Foreign Application Priority Data
Sep. 26, 2000 (FR) .......................................... 00 12325

(51) Int. Cl.[7] .............................................. B01D 53/14
(52) U.S. Cl. ........................... 95/174; 95/181; 95/183; 95/235; 95/236; 423/226
(58) Field of Search ......................... 95/236, 235, 172, 95/173, 174, 177, 178, 179, 181, 183; 423/220, 226, 228, 229, 227

(56) References Cited

U.S. PATENT DOCUMENTS

| | | | |
|---|---|---|---|
| 3,243,939 A | | 4/1966 | De Rooij |
| 3,607,048 A | * | 9/1971 | Karwat |
| 4,050,909 A | * | 9/1977 | Ranke |
| 4,336,233 A | * | 6/1982 | Appl et al. |
| 4,430,316 A | * | 2/1984 | Ranke et al. |
| 4,710,210 A | * | 12/1987 | Gazzi et al. |
| 4,861,360 A | * | 8/1989 | Apffel |
| 4,889,700 A | * | 12/1989 | Elgue et al. |
| 4,971,607 A | * | 11/1990 | Gazzi et al. |
| 4,999,031 A | * | 3/1991 | Gerhardt et al. |
| 5,071,454 A | * | 12/1991 | Streitberger et al. |
| 5,273,679 A | * | 12/1993 | Hihara et al. |
| 5,510,567 A | * | 4/1996 | Lermite et al. |
| 5,735,936 A | * | 4/1998 | Minkkinen et al. |
| 5,782,958 A | * | 7/1998 | Rojey et al. |
| 5,797,981 A | * | 8/1998 | Collin et al. |
| 6,001,153 A | * | 12/1999 | Lebas et al. |
| 6,102,987 A | * | 8/2000 | Gross et al. |
| 6,290,754 B1 | * | 9/2001 | Peytavy et al. |
| 6,342,091 B1 | * | 1/2002 | Menzel et al. |
| 6,436,174 B1 | * | 8/2002 | Grossman et al. |
| 2002/0059865 A1 | * | 5/2002 | Lemaire et al. |
| 2002/0104438 A1 | * | 8/2002 | Cadours et al. |
| 2002/0178918 A1 | * | 12/2002 | Lecomte et al. |

FOREIGN PATENT DOCUMENTS

WO    WO96/11164    4/1996

* cited by examiner

Primary Examiner—Duane S. Smith
(74) Attorney, Agent, or Firm—Antonelli, Terry, Stout & Kraus, LLP

(57) ABSTRACT

In a process for treating a gas containing acid gases, the gas is contacted with a methanol-containing aqueous phase and is then contacted in an absorption column with a mixture of solvents including mehtanol, water and a solvent heavier than methanol. Then, the mixture of solvents is at least partly regenerated through pressure reduction and/or heating. The treated gas is cooled by producing at least a methanol-containing aqueous phase that is at least partly recycled. The mixture of solvents flowing out at the bottom of the absorption column is cooled, then re-introduced at a higher level of the absorption column so as to control the temperature in the absorption column.

23 Claims, 2 Drawing Sheets

Figure 1:
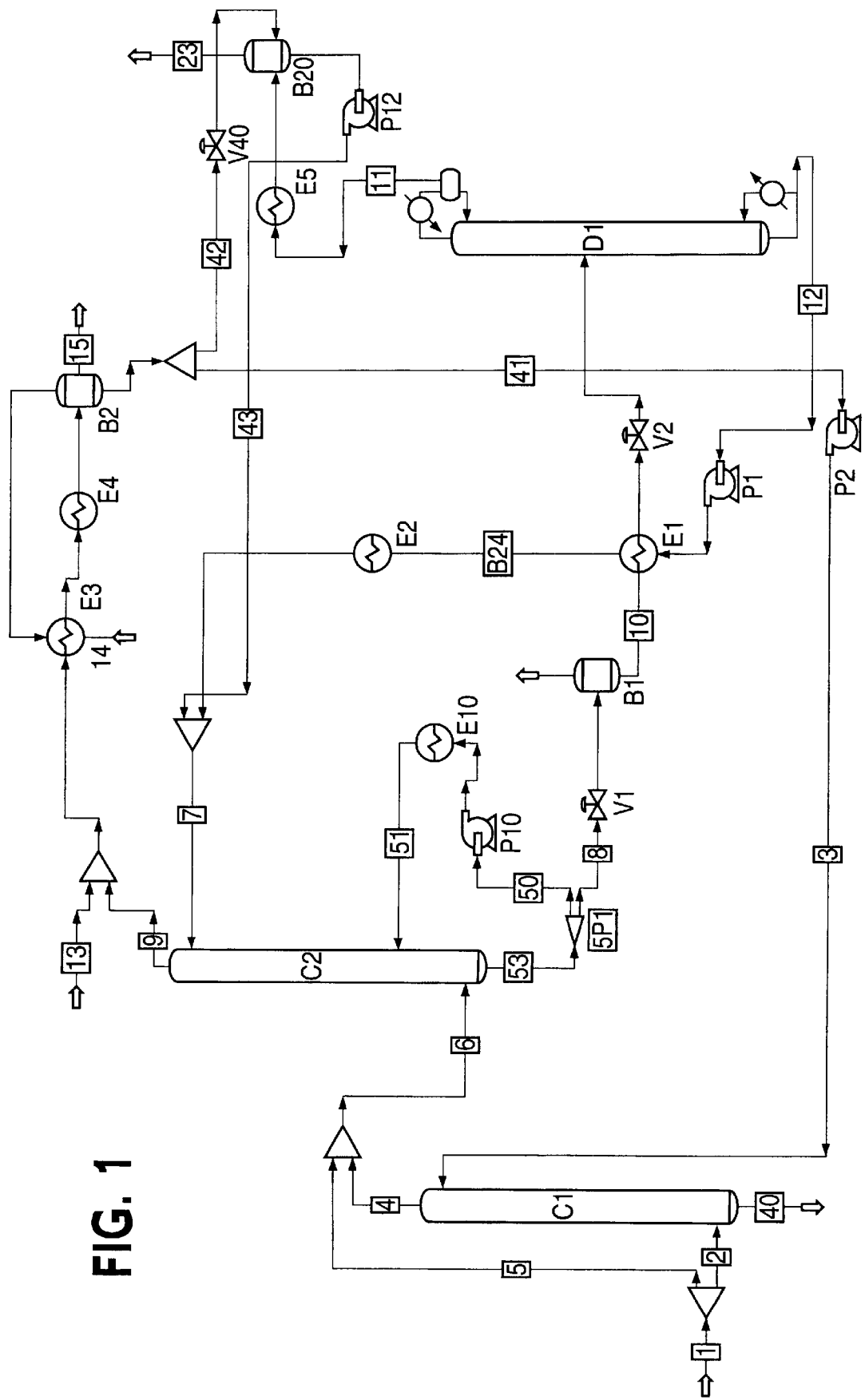

PROCESS FOR DEACIDIZING A GAS BY ABSORPTION IN A SOLVENT WITH TEMPERATURE CONTROL

FIELD OF THE INVENTION

The invention relates to a process intended for dehydration and deacidizing and/or stripping and deacidizing of a natural gas, using a mixture of solvents and temperature control for deacidizing.

BACKGROUND OF THE INVENTION

Treating a natural gas requires dehydration, stripping when the natural gas contains condensable hydrocarbons and deacidizing this gas when the proportion of acid gases contained therein is too high.

It is possible to dehydrate and to strip a gas such as a natural gas by cooling it in the presence of methanol so as to prevent formation of ice and/or hydrates.

It is well-known that, the gas being charged with methanol, a deacidizing stage can be carried out under advantageous conditions prior to the cooling stage by using for said deacidizing stage a mixture of solvents containing methanol.

It is also well-known that it is then possible to limit coabsorption of hydrocarbons by using a mixture of solvents comprising water, methanol and a solvent heavier than methanol.

The present invention allows, by reducing the temperature rise in the deacidizing column, to obtain excellent performances in terms of solvent flow rate and of acid gas absorption capacity.

Various heavy solvents can be used in the process according to the invention. The heavy solvent can be, for example, a polar solvent such as dimethylformamide (DMF), N-methylpyrrolidone (NMP) or dimethylsulfoxide (DMSO). The heavy solvent can also be a chemical solvent such as, for example, a secondary or tertiary amine, hydroxylated for example.

It is thus possible to combine the advantages of an amine as a chemical solvent and of methanol as a physical solvent. The presence of methanol notably allows to substantially reduce the proportion of solvent for relatively high acid gas contents in the gas to be treated. The presence of methanol also allows to absorb and to separate from the gas to be treated impurities such as, for example, mercaptans, carbonyl sulfide (COS) and carbon disulfide ($CS_2$).

It is also possible, in the process according to the invention, to use fractions of solvent mixtures having different compositions to optimize the conditions of the gas scrubbing process performed by the mixture of solvents.

SUMMARY OF THE INVENTION

The process according to the invention can generally be defined as a process for treating a gas containing acid gases, wherein:

(a) at least a fraction of the gas is contacted with a methanol-containing aqueous phase, the gas being thus charged with methanol at the end of stage (a), (b) the gas from stage (a) is contacted, in an absorption column, with a mixture of solvents comprising methanol, water and a solvent heavier than methanol, the gas flowing from the top of said absorption column being thus at least partly freed from the acid gases it contains at the beginning of the process prior to stage (a), the mixture of solvents flowing out at the bottom of said absorption column being charged with acid gases, (c) the mixture of solvents from stage (b) is at least partly regenerated through pressure reduction and/or heating by releasing at least partly the acid gases, the at least partly regenerated mixture of solvents being recycled to stage (b) at the end of stage (c), and (d) the gas from stage (b) is cooled by producing at least a methanol-containing aqueous phase which is at least partly recycled to stage (a), said process being characterized in that, in stage (b), the mixture of solvents flowing out at the bottom of said absorption column is cooled, then re-introduced at a higher level of said absorption column so as to control the temperature in said absorption column.

The process according to the invention is described in detail hereafter in connection with the diagram of FIG. 1.

DETAILED DESCRIPTION

The gas to be treated flows in through line 1. It contains for example methane, ethane, propane, butane, as well as heavier hydrocarbons, water and acid gases such as, for example, $H_2S$ and $CO_2$.

A fraction of this gas is sent through line 2 to contact column C1 where it is subjected to countercurrent contact with a solution of methanol in water flowing in through line 3. At the bottom of column C1, an aqueous phase substantially freed from methanol is discharged through line 40. At the top of column C1, a gas charged with methanol, that is mixed with the gas that has not flowed through column C1, is recovered through line 4. The gas thus obtained constitutes the gas charged with methanol obtained in stage (a). This gas is then sent through line 6 to column C2, where it is contacted with a mixture of solvents comprising methanol, water and a solvent heavier than methanol, which flows in through line 7. This mixture of solvents flows out through line 53, charged with acid gases, while the gas discharged at the top of the column through line 9 is at least partly freed from the acid gases it contains at the inlet of column C2 (stage (b)). At the bottom of column C2, at least part of the solvent is fed into line 50 by a pump P10 prior to being cooled by a suitable system in exchanger E10. This solvent is then re-introduced into column C2 through line 51 at a higher level and thus allows temperature control in the zone concerned. The zone concerned corresponds to the bottom of absorber C2, i.e. for example a column with n plates (n greater than or equal to 1, most often n greater than or equal to 15) and, in the case where n=15, the plates concerned are for example plates No. 13, 14 and 15, the plates being numbered from the top of the column.

The mixture of solvents from this stage (b) is first expanded to an intermediate pressure through expansion valve V1 by releasing a gas phase which contains at least part of the hydrocarbons that may have been coabsorbed in the mixture of solvents. The gas phase and the liquid phase thus obtained are separated in drum B1.

If the temperature at the top of column C2 is higher than the temperature at the bottom thereof, as a result of the absorption heat released, the gas flowing out of column C2 through line 9 carries along a greater amount of water than that flowing in through line 6. Similarly, a certain amount of water can be discharged with the acid gases through line 11. In order to compensate for these water losses of the solvent mixture circuit, makeup aqueous phase is required in this case. This makeup aqueous phase can be obtained for example by cooling the gas at the outlet of column C2 and by sending the condensed fraction back into the solvent mixture circuit. It is also possible, as shown in FIG. 1, to take a fraction of the aqueous phase collected in separating drum B2 and to recycle it through line 42 and expansion valve V40 to the solvent mixture circuit.

The flow rate of the makeup aqueous phase thus provided can for example be controlled by a solvent mixture level in a receiving or storage drum located for example at the outlet of column D1.

A gas phase is discharged at the top of drum B1. The residual solvent mixture is discharged through line 10 and sent to exchanger E1 where it is heated. It is then expanded through valve V2 and regenerated in distillation column D1. This column is cooled at the top, which allows to discharge through line 11 acid gases that contain a low proportion of solvents, and heated at the bottom, which allows to discharge through line 12 a mixture of solvents substantially freed from acid gases. The acid gases discharged through line 11 are subjected to a complementary cooling process in exchanger E5 so as to recover at least partly the residual methanol. The liquid phase thus obtained is recovered in separating drum B20, which also receives the makeup aqueous phase flowing in through line 42 and passing through expansion valve V40. The liquid phase thus collected in separating drum B20 is recycled by pump P12 through line 43 at the top of column C2. The mixture of solvents discharged through line 12 is taken up by pump P1 and sent through exchanger E1 where it is cooled by heating the mixture of solvents flowing in through line 10. It is then cooled in exchanger E2 by exchange with cooling air or water and recycled to column C2.

Regeneration of the solvent, which constitutes stage (c) of the process, can also be carried out according to patterns described by the applicant in patent FR-B-2,743,083 (corresponding to patent U.S. Pat. No. 5,782,958).

The gas from stage (b), which is discharged through line 9, receives makeup methanol flowing in through line 13. It is then cooled, first by inner exchange in exchanger E3, then by exchange with an external cooling fluid coming from a cooling circuit, in exchanger E4. This cooling allows to condense a solution of methanol and a liquid hydrocarbon phase. The gas phase thus obtained constitutes the treated gas that is substantially freed from the water, the acid gases and the heavy hydrocarbons it contains at the beginning. The three-phase mixture obtained is separated in drum B2. The treated gas is passed into exchanger E3, where it is heated by cooling the gas coming from column C2, and it is discharged through line 14 (stage (d)).

The liquid hydrocarbon phase obtained is discharged through line 15 and the methanol-containing aqueous phase fraction obtained that is not discharged through line 42 is recycled through line 41 by pump P2, then through line 3 to column C1.

The mixture of solvents sent through line 7 to column C2 comprises methanol, water and a solvent heavier than methanol.

The methanol content of the gas discharged through line 9 must be high enough to prevent formation of ice and/or of hydrates during the cooling stage, the makeup methanol flowing in through line 13 being reduced and intended to compensate for the losses. This means that this methanol content is all the higher as the cooling temperature at the outlet of exchanger E4 is low. The methanol content in the mixture of solvents flowing in through line 7 is also all the higher as the temperature to which the gas is cooled is low.

The methanol content can be readily controlled by means of the makeup methanol flowing in through line 13. The amount of makeup methanol is for example controlled according to the methanol content in the aqueous phase recovered in separator B2 so as to reach the content required to prevent hydrates formation.

The proportion of methanol in the mixture of solvents can in this case range between 5 and 50% by molar fraction for example (boundaries included).

The heavy solvent that goes into the mixture of solvents can be at least one polar solvent selected from the group consisting of DMF, NMP, DMSO, as described above; it can also be sulfolane, propylene carbonate, an alcohol heavier than methanol, an ether or a ketone. The main requirement to be met is that its boiling-point temperature has to be above the boiling-point temperature of methanol and preferably above the boiling-point temperature of water. This solvent also has to be at least partly miscible with water and methanol.

The proportion of heavy solvent in the mixture of solvents can in this case range between 10 and 60% by molar fraction for example (boundaries included).

The complement is provided by the water content, which is preferably at least 10% by molar fraction.

The heavy solvent that goes into the mixture of solvents can also be a solvent of chemical type such as, for example, a secondary or tertiary amine, hydroxylated for example, selected from among monoethanolamine, diethanolamine, diglycolamine, diisopropanolamine, methyldiethanolamine.

The proportion of amine in the mixture of solvents can range between 1 and 10% by molar fraction for example (boundaries included).

The heavy solvent is selected according to the specifications required for the treated gas. If selective deacidizing is desired, which consists in eliminating $H_2S$ much more selectively than $CO_2$, a selective amine such as methyldiethanolamine for example will be used.

It is also possible to use a mixture of heavy solvents to optimize the characteristics of the mixture of solvents.

It is also possible to add additives known to the man skilled in the art, such as additives allowing to activate $CO_2$ absorption for example, or additives acting as corrosion inhibitors, or additives acting as antifoaming agents. It can also be advantageous to filter the mixture of solvents that is sent to column C2 in order to stop solid particles which can favour foaming.

Contacting in column C1, working under countercurrent conditions, at least part of the gas to be treated with the methanol-containing aqueous phase from stage (d) allows to discharge, at the bottom of said column, a substantially methanol-free aqueous phase. This allows to readily recover and recycle the methanol and to prevent pollution linked with the presence of methanol in the aqueous phase discharged.

The contact column used can be of various types known to the man skilled in the art: plate column or packed column. In the case of a packed column, it can be advantageous to use a stacked packing.

Similarly, the other columns used in the process, notably C2 and D1 used in stages (b) and (c), can be of various types known to the man skilled in the art: plate columns or packed columns, in particular stacked packing columns.

Finally, as regards the external circulation system used for the solvent, cooling and reintroduction thereof in column C2, any system known to the man skilled in the art can be used.

The following numerical example illustrates the method of operation of the process according to the invention. This example of implementation of the process according to the invention is described in connection with FIG. 1.

The composition of the natural gas is as follows (in kmol/h):

| | |
|---|---:|
| Water | 16.66 |
| Nitrogen | 129.52 |
| Carbon dioxide | 455.81 |
| Hydrogen sulfide | 2589.13 |
| Methane | 6822.16 |
| Ethane | 1354.97 |
| Propane | 713.60 |
| Isobutane | 97.14 |
| n-Butane | 191.79 |
| Isopentane | 44.83 |
| n-Pentane | 38.61 |
| Heavier hydrocarbons | 10.33 |
| Total | 12464.22 |

The gas to be treated flows in through line 1 at a temperature of 45° C. and at a pressure of 80 bars with a flow rate of substantially 12464 kmol/h. A fraction of this gas (70%) is injected into contact column C1 through line 2. A solution containing 65% by mass of methanol in water, at a flow rate of 39.51 kmol/h and at a temperature of 45° C., is injected countercurrent thereto into column C1 through line 3. At the bottom of column C1, an aqueous phase containing 50 ppm by moles of methanol at a flow rate of 18.85 kmol/h is discharged through line 40. At the top of column C1, the gas charged with methanol is discharged through line 4 and mixed with the gas flowing in through line 5, that has not flowed through column C1.

The gas thus obtained is sent through line 6 to column C2. A solution containing 20% by mass of methanol and 30% by mass of diethanolamine in water is injected countercurrent thereto in column C2 through line 7, at a temperature of 50° C. and a flow rate of 24000 kmol/h. At the bottom of column C2, the mixture of solvents charged with carbon dioxide and hydrogen sulfide is recovered through line 53 at a temperature of 60° C. Part of this solvent is sent through line 50, by means of pump P10, at a flow rate of 57434 kmol/h, to exchanger E10. It flows out of the exchanger at 50° C. prior to being reintroduced into column C2 through line 51.

The gas discharged at the top of column C2 through line 9 only contains 15 ppm by moles of carbon dioxide and 5 ppm by moles of hydrogen sulfide. This gas is cooled in exchangers E3 and E4 to a temperature of −26° C. The three-phase mixture obtained is separated in drum B2. The treated gas discharged through line 14 has a flow rate of 5474 kmol/h. The liquid hydrocarbon phase obtained is discharged through line 15. The methanol-containing aqueous phase is partly recycled to column C1 through line 41, the other part (20%) being sent to drum B20.

The mixture of solvents charged with carbon dioxide and hydrogen sulfide is expanded to a pressure of 27 bars by expansion valve V1, then sent to separating drum B1. The liquid phase from drum B1 is sent through line 10 to exchanger E1, where it is heated to 80° C. It is then expanded to 0.15 MegaPascal (MPa) and injected into distillation column D1. This column is cooled at the top at a temperature of 40° C. and heated at the bottom. The mixture of solvents recovered through line 12 at a temperature of about 104° C. is taken up by pump P1, then cooled in exchangers E1 and E2 prior to being recycled to column C2.

The gas discharged at the top of column D1 through line 11 is cooled to −26° C. after passing through exchanger E5. Drum B20 allows to separate a liquid phase essentially containing methanol and water from a gas phase essentially containing carbon dioxide and hydrogen sulfide. The aqueous phase is recycled to column C2 through line 43. Within the scope of this example, recycling is performed at the top of column C2, but it could also be carried out at an intermediate level of column C2 without departing from the scope of the present invention. The gaseous phase is discharged through line 23.

One of the main improvements provided by the invention lies in the reduction in the flow rate of the solvent; in fact, in the example mentioned, the energy consumption of the boiler in column D1 is 40 Mega-kilo calories per hour (Mkcal/h), with cooling of the absorber bottom by exchanger 10 that requires 14 Mkcal/h. The same feed treated without a cooling system will require a flow rate of 31000 kmol/h in line 7 to obtain the same specifications for the treated gas, i.e. an energy consumption of the boiler in column D1 of 64 Mkcal/h. It thus clearly appears that the invention allows to greatly cut down on operating costs in relation to conventional processes such as, for example, the process described in patent FR-B-2,743,083.

In the process according to the invention, it can be advantageous, in order to optimize performances, to carry out stage (b) by contacting the gas successively with fractions of solvent mixtures having different compositions. If a mixture fraction is sent to the top of the column and another one to an intermediate point, it is advantageous to send to the top a relatively methanol-poor fraction of the solvent mixture and to send to an intermediate point a relatively methanol-rich fraction of the solvent mixture.

Figure 2:
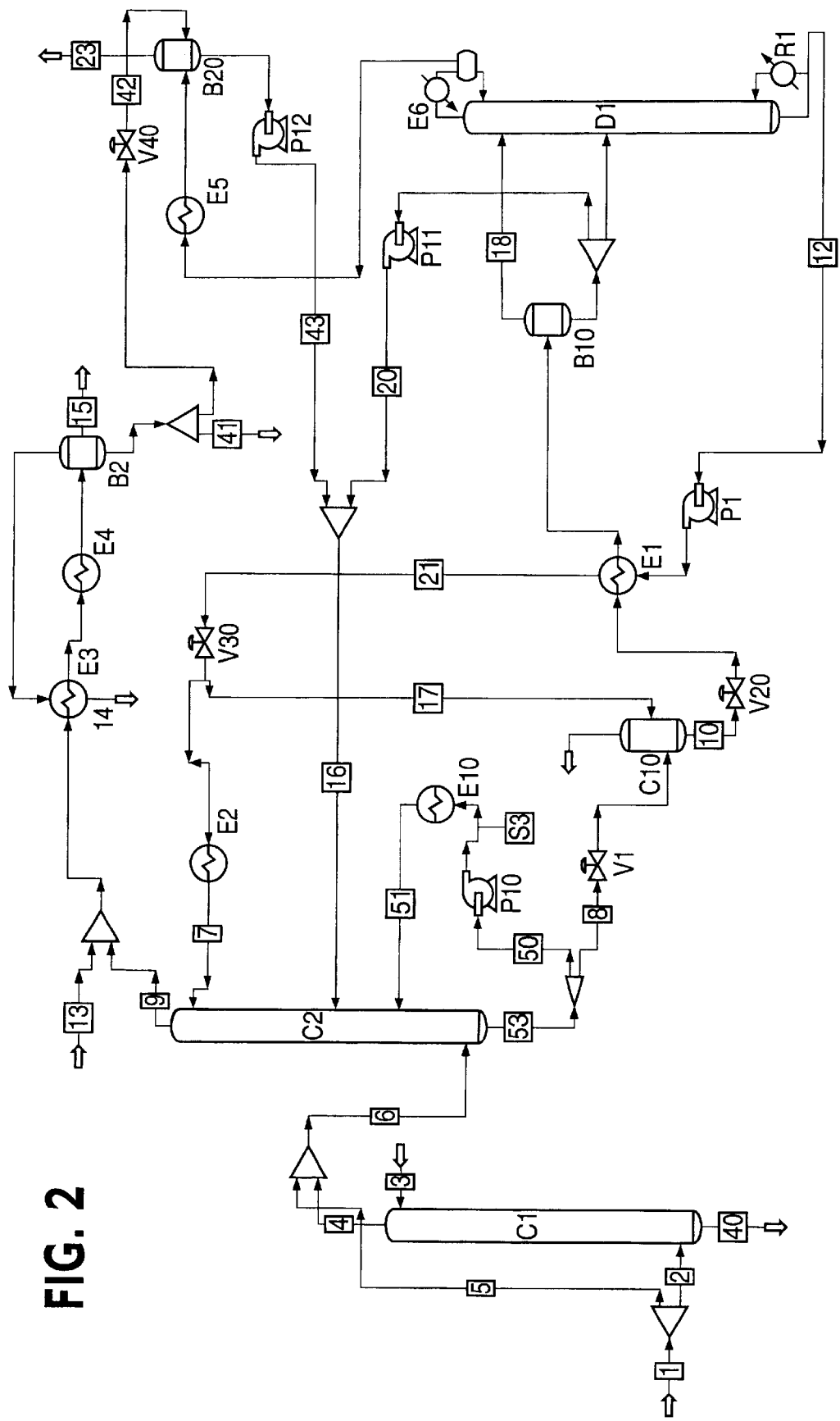

An example of such an embodiment is described in connection with the diagram of FIG. 2.

Column C1 is operated as in the case of the example described in connection with FIG. 1.

The gas charged with methanol flows into column C2 through line 6. It is first contacted in a first zone (lower part) of column C2 with a relatively methanol-rich fraction of solvent mixture introduced through line 16. The methanol content in this first fraction of solvent mixture can for example range between 20 and 70% by molar fraction.

The gas is then contacted in a second zone (upper part) of column C2 with a relatively methanol-poor fraction of solvent mixture introduced through line 7. The methanol content of this second fraction of solvent mixture can for example range between 5 and 30% by molar fraction. This methanol content has to be all the higher as the methanol content of the gas flowing out through line 9 is high, i.e. all the higher as the temperature at the outlet of exchanger E4 is low, so as to prevent formation of ice and/or of hydrates.

The mixture of solvents from stage (b), i.e., in the case of the example described in connection with FIG. 2, which flows out of column C2 through line 8, is regenerated by expansion, then by heating in a countercurrent contact column D1, the solvent phase taken from the bottom of said column forming the relatively methanol-poor solvent mixture fraction that is injected at the top of the contact column used during stage (b), i.e. column C2 in the case of the example described in connection with FIG. 2.

In this embodiment, the mixture of solvents charged with acid gases that flows out through line 8 is first expanded to an intermediate pressure level through valve V1, by releasing a gas phase that contains at least part of the hydrocarbons that may have been coabsorbed in the mixture of solvents.

This gas phase can be washed by a relatively methanol-poor solvent mixture fraction recovered at the bottom of the regeneration column used during stage (c), whose flow rate is controlled by distribution valve V30 and which is sent through line 17 to the top of a countercurrent contact column arranged in column element C10. The gas flowing out of the top of column element C10 is thus substantially freed from the acid gases it contained and it can be used for example as fuel gas or be recompressed and mixed with the treated gas.

This layout is not limited to the embodiment described in connection with FIG. 2.

According to a particular embodiment, the fraction(s) of solvent mixture coming from the regeneration column used during stage (c) are cooled to a temperature close to the temperature at which stage (b) was carried out, by thermal exchange with the mixture of solvents from stage (b) and possibly by a complementary thermal exchange with a cooling fluid such as water or air.

Thus, even for other embodiments, it is possible to subject the mixture of solvents from stage (b) to a first stage of expansion to an intermediate pressure so as to release at least part of the coabsorbed hydrocarbons.

Similarly, for other embodiments, it is also possible to wash the gaseous fraction obtained after expansion to an intermediate pressure of the mixture of solvents from stage (b), by means of a relatively methanol-poor solvent mixture fraction recovered at the bottom of the regeneration column used during stage (c).

At the outlet of column element C10, the mixture of solvents from stage (b) is again expanded to a low pressure, for example a pressure close to atmospheric pressure, through expansion valve V20. The mixture in mixed liquid-vapour form is heated in exchanger E1 by heat exchange with the mixture of solvents coming from the bottom of regeneration column D1, then separated in separating drum B10. The vapour phase essentially consisting of acid gases and methane is discharged through line 18. The liquid phase thus obtained through expansion of at least a fraction of the mixture of solvents from stage (b) is divided into two fractions. A first fraction is sent to pump P11 through line 20 and forms the relatively methanol-rich solvent mixture fraction that is sent through line 16 to an intermediate point of absorption column C2 used during stage (b). The partly regenerated solvent thus obtained has an acid gas content that is lower than the content that would be obtained if only the liquid were heated prior to introducing it into the column, as described for example in patent FR-B-2,743,083.

A second fraction of the mixture of solvents obtained at the outlet of separating drum B10 is sent to regeneration column D1. A vapour reflux is generated at the bottom of column D1 by means of reboiler R1 and a liquid reflux is generated at the top of column D1 by means of condenser E6.

The gas phase resulting from partial condensation in E6, which is discharged at the top through line 19, essentially consists of acid gases and methanol.

In this embodiment, it is mixed with the gas phase discharged through line 18 and the gaseous mixture thus obtained is cooled in exchanger E5. The liquid-vapour mixture thus obtained is separated in separating drum B20. Drum B20 is supplied with makeup aqueous phase through line 42 and expansion valve V40. The gas phase essentially consisting of the separated acid gases is discharged through line 23. The methanol-rich liquid phase is sent to pump P12 through line 43 and, after mixing with the fraction flowing through line 20, it forms the solvent mixture fraction that is sent through line 16 to an intermediate point of column C2.

The liquid phase that is discharged at the bottom of column D1 is depleted in methanol. In column D1, stripping at the bottom of the column is provided by a methanol-rich vapour, which provides reboiling of column D1 at a lower temperature and by supplying less heat than in the absence of methanol.

The liquid phase discharged at the bottom of column D1 is sent to pump P1. It is cooled in exchanger E1, from which it is discharged through line 21. It is then divided into two fractions by means of distribution valve V30. A first fraction, which has the highest flow rate, is cooled in exchanger E2 by cooling air or water and sent to the top of column C2 through line 7. A second fraction is sent through line 17 to the top of column element C10.

Various other layouts can be used without departing from the scope of the invention.

When the gas to be treated contains a high proportion of $CO_2$ and $H_2S$, it may be desired to obtain distinct acid gas fractions, rich in $CO_2$ and $H_2S$ respectively.

In this case, it is possible to operate for example according to the pattern described in patent FR-B-2,743,083 filed by the applicant and in connection with FIG. 3, which diagrammatically shows only a part of the device.

Another layout that can be used consists, instead of directly cooling the acid gases obtained by expansion or heating of the mixture of solvents from stage (b), in sending them to a rectifying column element operating at a lower temperature than that prevailing in stage (b). Regeneration of the mixture of solvents from stage (b) is carried out after expansion, at least partly in a rectifying column at least part of which operates by simultaneous thermal exchange with at least part of the regenerated mixture of solvents recycled to stage (b). The acid gases are thus freed from the water and the methanol they contain. This other layout is described in connection with FIG. 4 of patent FR-B-2,743,083 filed by the applicant.

It is also possible to eliminate at least partly the methanol carried along in the acid gases by washing these acid gases with water from stage (a), i.e., in the embodiment examples described in connection with FIGS. 1 and 2, recovered at the bottom of column C1, the methanol-containing aqueous phase thus obtained being sent back to stage (a), i.e., in the embodiment examples described in connection with FIGS. 1 and 2, at the top of column C1.

According to a particular embodiment, the layout described in connection with the diagram of FIG. 5 of patent FR-B-2,743,083 filed by the applicant can be used. In this case, the mixture of solvents from stage (b) charged with acid gases and obtained at the bottom of column C10 shown in FIG. 2 is sent, after expansion, to several levels of the regeneration column of stage (c), three for example. The relatively methanol-rich solvent mixture fraction that is sent to an intermediate point of the absorption column used during stage (b) is taken from an intermediate point of the regeneration column used during stage (c).

Absorption stage (b) is carried out in column C2 at a temperature ranging between +10 and +40° C. for example, but it is also possible, in order to reduce the proportion of solvent, to carry out this stage at lower temperatures, with a mixture of solvents selected so as not to become too viscous at such temperature levels.

The pressure at which the absorption stage is carried out in column C2 can range between some bars and more than a hundred bars. It can be close to 70 bars for example.

During stage (c), the natural gas can be cooled to a temperature ranging for example between 0 and −100° C., the proportion of methanol in the solvent mixture fraction sent to the top of the contact column used during stage (b) being adjusted so as to obtain in the gas from stage (b) a methanol content allowing to prevent formation of hydrates at the lowest temperature obtained during stage (c).

Regeneration of the mixture of solvents from stage (b) can be carried out after expansion at least partly in a device performing fractionation and simultaneous thermal exchange with at least part of the regenerated solvent mixture recycled to stage (b).

Such a layout is illustrated by the embodiment example shown in the diagram of FIG. 6 of patent FR-B-2,743,083 filed by the applicant.

What is claimed is:

1. A process for treating a gas containing acid gases, wherein:
    (a) at least a fraction of the gas is contacted with a methanol-containing aqueous phase, the gas being thus charged with methanol at the end of stage (a),
    (b) the gas from stage (a) is contacted, in an absorption column, with a mixture of solvents comprising methanol, water and a solvent heavier than methanol, the gas flowing from the top of said absorption column being thus at least partly freed from the acid gases it contains at the beginning the process prior to stage (a), the mixture of solvents flowing out at the bottom of said absorption column being charged with acid gases,
    (c) the mixture of solvents from stage (b) is at least partly regenerated through pressure reduction and/or heating by releasing at least partly the acid gases, the at least partly regenerated mixture of solvents being recycled to stage (b) at the end of stage (c), and
    (d) the gas from stage (b) is cooled by producing at least a methanol-containing aqueous phase which is at least partly recycled to stage (a),
said process being characterized in that, in stage (b), the mixture of solvents flowing out at the bottom of said absorption column is cooled, then reintroduced at a higher level of said absorption column, so as to control the temperature in said absorption column.

2. A process as claimed in claim 1, characterized in that the solvent heavier than methanol incorporated to the mixture of solvents used during stage (b) has a boiling-point temperature that is above that of methanol and it is at least partly miscible with water and methanol.

3. A process as claimed in claim 1, wherein the solvent heavier than methanol incorporated to the mixture of solvents used during stage (b) is a secondary or tertiary amine.

4. A process as claimed in claim 1, wherein during stage (a), contacting between at least part of the gas to be treated and the methanol-containing aqueous phase from stage (d) is a countercurrent contact carried out in a column, the aqueous phase discharged at the bottom of said column being substantially freed from methanol.

5. A process as claimed in claim 1, wherein during stage (b), the gas from stage (a) is brought into countercurrent contact in said absorption column successively with a fraction of the relatively methanol-rich mixture of solvents, which is sent to an intermediate point of the absorption column, then with a relatively methanol-poor fraction of the mixture of solvents which is sent to the top of said absorption column.

6. A process as claimed in claim 1, wherein during stage (c), the mixture of solvents from stage (b) is regenerated by expansion, then by heating in a countercurrent regeneration column, the solvent phase taken from the bottom of said regeneration column forming the relatively methanol-poor solvent mixture fraction that is injected at the top of said absorption column used during stage (b).

7. A process as claimed in claim 1, wherein the mixture of solvents from stage (b) is subjected to a first stage of expansion to an intermediate pressure so as to release at least part of the coabsorbed hydrocarbons.

8. A process as claimed in claim 7, wherein the gaseous fraction resulting from expansion to an intermediate pressure of the mixture of solvents from stage (b) is washed by a fraction of the relatively methanol-poor solvent mixture recovered at the bottom of the regeneration column used during stage (c).

9. A process as claimed in claim 1, wherein the liquid mixture of solvents from stage (b) obtained after a first expansion stage is again expanded in a second expansion valve, then heated by the effluent at the bottom of the regeneration column in mixed form of liquid phase and vapor phase, the liquid phase obtained is separated from the vapor phase in a drum, part of said liquid phase being sent back to an intermediate level of the absorption column and the other being sent to the regeneration column, said vapor phase being introduced at the top of the regeneration column.

10. A process as claimed in claim 5, wherein the relatively methanol-rich solvent mixture fraction that is sent to an intermediate point of the absorption column used during stage (b) is obtained by expansion of at least a fraction of the mixture of solvents from stage (b).

11. A process as claimed in claim 1, wherein the relatively methanol-rich solvent mixture fraction that is sent to an intermediate point of the absorption column used during stage (b) is taken from an intermediate point of the regeneration column used during stage (c).

12. A process as claimed in claim 1, wherein the mixture of solvents from stage (b) is sent after expansion to several levels of the regeneration column used during stage (c).

13. A process as claimed in claim 1, wherein the solvent mixture fraction(s) coming from the regeneration column used during stage (c) are cooled to a temperature close to the temperature at which stage (b) is carried out by thermal exchange with the mixture of solvents from stage (b).

14. A process as claimed in claim 1, wherein regeneration of the mixture of solvents from stage (b) is carried out after expansion, at least partly in a rectifying column at least part of which operates by simultaneous thermal exchange with at least part of the regenerated solvent mixture recycled to stage (b).

15. A process as claimed in claim 1, wherein the acid gases released by expansion and/or heating of the mixture of solvents from stage (b) are washed by part of the aqueous phase from stage (d) so as to recover at least partly the methanol they contain, the methanol-containing aqueous phase thus obtained being recycled to stage (b).

16. A process as claimed in claim 1, wherein the acid gases released during stage (c) by expansion and/or heating of the mixture of solvents from stage (b) are rectified at a temperature below the temperature at which stage (b) is carried out so as to free them from the methanol and the water they contain.

17. A process as claimed in claim 1, wherein stage (b) is carried out at a temperature ranging between +10 and +40° C.

18. A process as claimed in claim 1, wherein during stage (d), the natural gas is cooled to a temperature ranging between 0° C. and −100° C., the proportion of methanol in the solvent mixture fraction sent to the top of the absorption column used during stage (b) being adjusted so as to obtain in the gas from stage (b) a proportion of methanol allowing to prevent formation of hydrates at the lowest temperature obtained during stage (c).

19. The process of claim 2 wherein the solvent heavier than methanol incorporated to the mixture of solvents used during stage (b) has a boiling-point temperature that is above that of water.

20. The process of claim 3 wherein the secondary or tertiary amine is hydroxylated.

21. The process of claim 1 wherein the solvent heavier than methanol incorporated to the mixture of solvents used during stage (b) is a polar solvent selected from the group consisting of DMF, NMP and DMSO.

22. The process of claim 13 wherein the solvent mixture fraction(s) coming from the regeneration column used during stage (c) are cooled to a temperature close to the temperature at which stage (b) is carried out by thermal exchange including complementary thermal exchange with a cooling fluid.

23. The process of claim 22 wherein the cooling fluid is water or air.

* * * * *